Jan. 25, 1944.  G. J. HUEBNER, JR., ET AL  2,340,125
FLUID PRESSURE ACCUMULATOR
Filed Jan. 14, 1942
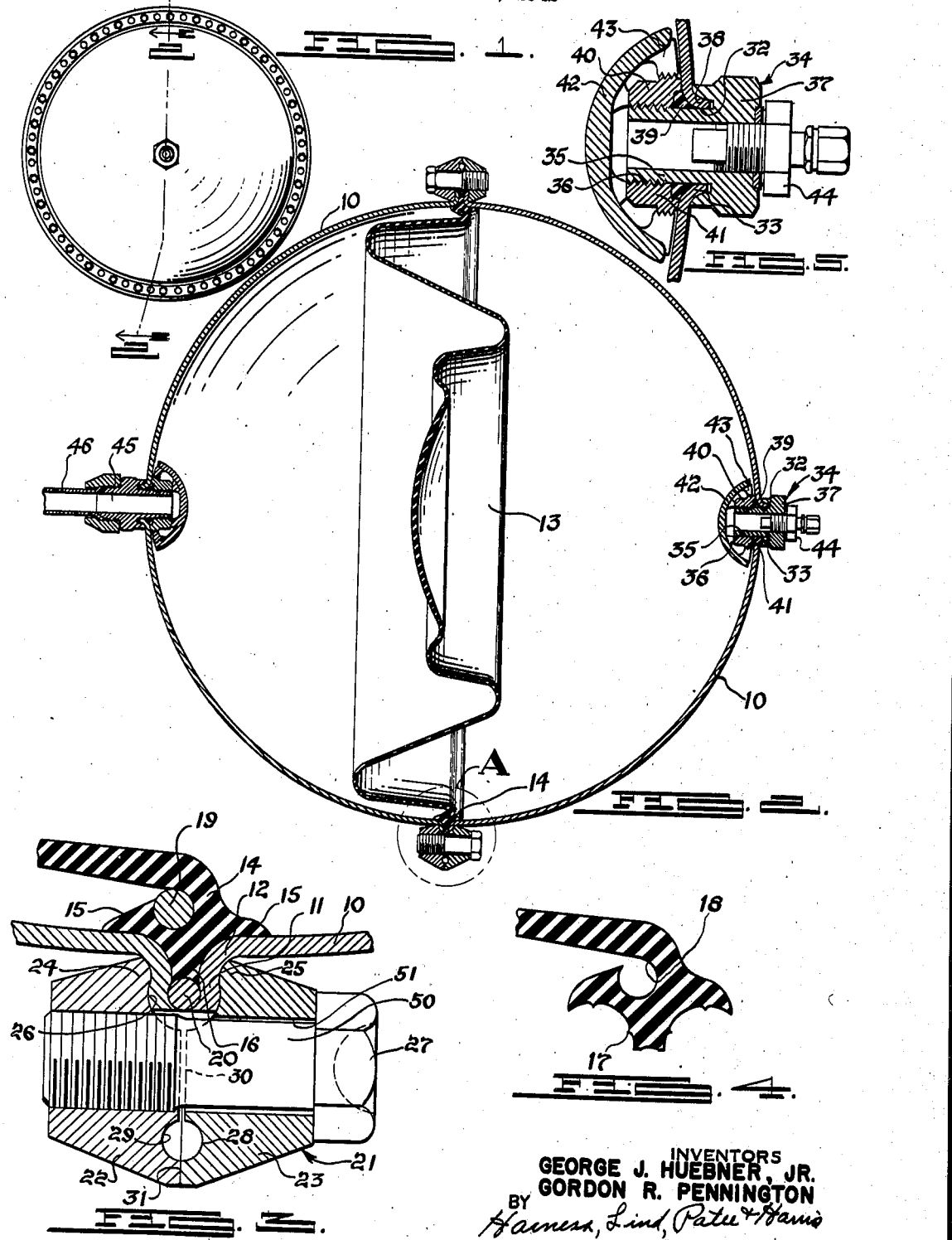
INVENTORS
GEORGE J. HUEBNER, JR.
GORDON R. PENNINGTON
BY
ATTORNEYS Patented Jan. 25, 1944

2,340,125

UNITED STATES PATENT OFFICE 2,340,125

FLUID PRESSURE ACCUMULATOR

George J. Huebner, Jr., Detroit, and Gordon B. Pennington, Bloomfield Hills, Mich., assignors to Chrysler Corporation, Highland Park, Mich., a corporation of Delaware Application January 14, 1942, Serial No. 426,722

12 Claims. (Cl. 138—30)

This invention relates to an improved fluid pressure accumulator.

More particularly, the invention pertains to a device of this kind which comprises stamped sheet metal wall structures.

Heretofore, it has been the practice to initially form accumulators of this kind from semi-spherical forged steel sections by securing the latter together with the marginal edges of an elastic diaphragm clamped therebetween. Since the mating edges of the semi-spherical sections of an accumulator of this kind have to be thick enough to serve this clamping action and to also facilitate secure attachment of the sections to each other, it has been the practice to initially form the entire walls of sections to the thickness required at their mating edge portions and to then turn down all but the mating edge portions to the thickness dictated by the pressure under which fluid medium is to be accumulated. Considerable difficulty has also been encountered in clamping the margins of the diaphragm between the mating edges of the forged sections without injuring the diaphragm.

One of the main objects of the invention is to provide an accumulator having semi-spherical symmetrical sections adapted to be formed from sheet of substantially uniform thickness.

Another object of the invention is the provision of improved means for clamping together the mating edges of sheet metal sections of this kind and simultaneously, hermetically sealing the edge portions of an elastic diaphragm therebetween in order to partition the interior of the accumulator.

Other objects of the invention are to provide a diaphragm in a device of this kind which has a marginal portion formed to cooperate with the mating edges of the semi-spherical sheet metal sections in partitioning one compartment in the interior of the accumulator from another; to provide a metal wire reinforcing ring in the formed marginal edge portions of the diaphragm which is so located when the parts of the device are assembled as to lock the outer edges of the diaphragm against movement in respectively opposite directions through the compression of thin thicknesses of the elastic diaphragm material between the ring and associated portions of the sheet metal wall structure; to provide rigid clamping members around the mating edges of the sheet metal sections which exert a press fitting engagement upon the latter; to provide a clamping member of this kind which has spaced jaws so shaped with respect to the mating edge portions as to somewhat deform the extremities of the latter about a rigid wire ring positioned therebetween.

Additional objects of the invention are to provide improved fittings for accommodating connection of the fluid pressure conduits to the chambers at respectively opposite sides of the diaphragm; to provide fittings of this kind which are adapted to be mounted on the sheet metal wall structure mainly by a press fitting engagement on a flange comprising outwardly bent portions of the sheet metal wall portions surrounding an aperture therein; to provide an internal seal between the wall structure and fitting which comprises yieldable material; and to provide a nut member on an inclined portion of the fitting which extends into the interior of the accumulator for compressing the yieldable seal and bearing outwardly against the internal surface of the wall structure in opposition to an abutment on the fitting which contacts corresponding parts of the external surface of the wall structure in order to clampingly assist in attachment of the fitting to the latter.

An illustrative embodiment of the invention is shown in the accompanying drawing, in which:

Fig. 1 is a side elevational view of an accumulator embodying the invention.

Fig. 2 is a central sectional view taken on the line 2—2 of Fig. 1.

Fig. 3 is an enlarged fragmentary sectional view of the structure within the circle A of Fig. 2.

Fig. 4 is a fragmentary sectional view of the formed edge portions of the diaphragm illustrated in Fig. 3 but showing the latter in uncompressed state.

Fig. 5 is an enlarged detail view of the fitting shown at the right in Fig. 2.

The accumulator illustrated in the drawing may be used in any fluid pressure system but it is particularly adapted for use in fluid pressure systems of airplanes which are relied upon to operate accessory equipment such as mechanism for raising and lowering landing gears. The purpose of the accumulator is to store fluid under pressure during proper operation of the engine of the airplane so as to provide reserve energy in the event operation of the engines is discontinued in order to efficiently operate the landing gear lifting and lowering apparatus and other fluid pressure responsive mechanism with which the airplane is provided.

The accumulator embodying our invention comprises substantially identical semi-spherical sections 10 which are formed in suitable dies from sheet metal of substantially uniform thickness. The edge portions of the sections 10 are bent outwardly to provide mating edges 11 having junctions 12 of arcuate cross section between the outer extremities thereof and the main body portions of the sections 10.

An elastic diaphragm 13 disposed in the interior of the accumulator is provided with formed marginal edge portions 14 which comprise oppositely extending flanges 15 and an intermediate outwardly extending web 16. The elastic diaphragm 13 preferably comprises rubber or synthetic rubber-like material such as Neoprene and the web 16 of its formed edge portions is adapted to extend between the arcuate junctions and innermost parts of the mating edge portions 11. The surfaces of the flanges 15 of the formed edge portions of the diaphragm are shaped to conform with the surface of the arcuate junctions 12 and adjacent parts of the mating edge and body portions 11 and 10 respectively. These surfaces, as illustrated in Fig. 4, are also provided with relatively sharp edged projecting ribs 17 which are adapted to be firmly compressed against the surfaces of the sheet metal sections 10 with which they register when the diaphragm is clamped in position between the latter. The ribs 17 serve to localize the pressure applied by the formed edges of the diaphragm upon the internal surface of the sheet metal sections 10 with which they contact thereby producing effective seals between these parts of the structure.

The formed edge portion 14 of the diaphragm 13 is provided at a location opposite the web 16 thereof with a circumferentially extending groove 18 in which is disposed a rigid wire ring 19. The wire ring is so located with respect to the surfaces of the formed edge portions of the diaphragm which contact with the arcuate junction portions 12 of the sheet metal sections 10 as to provide a relatively thin thickness of rubber between the wire ring 19 and the opposite arcuate junction portions 12. This relatively thin thickness of rubber is stressed in compression in resisting displacement of the wire ring 19 and associated portion of the formed edge part of the diaphragm in respectively opposite directions. A wire ring 20 is disposed between the outer extremities of the mating edge portions 11 of the sheet metal sections 10 in order to positively hold the outermost parts of the mating edge portions against inward movement beyond a predetermined limit.

A clamping band generally designated by the numeral 21 is disposed around the mating edge portions of the sheet metal sections 10 in order to securely hold the latter together and to retain the web 16 of the formed edge portions of the diaphragm under compression between parts of the mating edge portions. The clamping band 21 comprises complementary rings 22 and 23 having spaced jaws 24 and 25, respectively, which are arcuately formed to bear against the external surfaces of the arcuate junction portions 12 of the sheet metal sections 10 as illustrated in Fig. 3. The jaws 24 and 25 are recessed as at 26 to accommodate the outer extremities of the mating edge portions 11 between which the wire ring 20 is disposed. In assembling this structure, the inner extremities of the jaws 24 and 25 which register with the junction portions 12 of the mating edges actually deform the sheet metal of the mating edge portions inwardly to firmly clamp the vane 16 of the formed edges of the diaphragm 13 between the mating edge portions 11. The complementary rings 22 and 23 are firmly urged together by a series of bolts 27, the heads of alternate bolts of which are disposed on respectively opposite sides of the clamping band 21 and threaded in apertures of correspondingly opposite rings of the clamping band. Formed in the complementary rings 22 and 23 are registering grooves 28 and 29, respectively. The metal between the grooves 28 and 29 of the rings and the grooves between the jaws 24 and 25 is cut away as illustrated at 30 so as to cause the rings 22 and 23 to abut only at 31. The unthreaded shank portion 50 of each bolt 27 is reduced in diameter to provide a clearance 51 between it and the walls of the opening in the ring through which it extends. By virtue of this construction, the force applied on the rings 22 and 23 by the bolts 27 is transmitted by leverage of considerable length to the jaw portions 24 and 25 and from the latter to the mating edge portions of the sheet metal sections 10.

Each sheet metal section 10 is provided with an opening 32 which is surrounded by an outwardly bent flange 33 comprising portions of the sheet metal of the wall structure. Mounted in each opening 32 is a fitting generally designated by the numeral 34 which is adapted to facilitate communicative connection of a conduit to the chamber on respectively opposite sides of the diaphragm 13. Each fitting 34 comprises a tubular body portion 35 having threads 36 on its exterior and a head portion 37 in which is formed a tapered groove 38. The tubular body part 35 of the fitting is adapted to extend into the interior of the accumulator while the flange 33 is receivable in a press-fitted relationship in the tapered groove 38. A sealing washer 39, preferably comprising rubber or synthetic rubber-like material such as Neoprene which is resistant to oil, is disposed around the tubular body portion 35 adjacent the inner surfaces of the sheet metal section 10 at which the opening 32 is located. The sealing member 39 is compressed against such surfaces of the sheet metal section 10 by a nut member 40 threaded on the threads 36 of the exterior of the tubular body section 35. The nut 40 is provided with an annular recess in which the sealing member 39 is receivable and with a surrounding flange 41 which is adapted to abut against the portions of the inner surface of the sheet metal section 10 with which it registers in order to firmly draw the flange 33 into the tapered recess 38 so as to thereby cam the flange firmly against the fitting 34. A shield 42 of generally dome shaped construction is threaded on the flange 41 of the nut 40 and provided with internal passage 43 through which fluid medium may pass from the interior of the accumulator through the central passage of the tubular body portion 35. The external end of the central passage of the fitting 34 shown at the right side of Fig. 2 is threaded to receive a valve member 44 by which air pressure may be applied on one side of the diaphragm 13. The fitting shown at the left side of Fig. 2 is similar in construction to the fitting shown at the right side thereof with the exception that an externally threaded nipple 45 is formed on the outer extremity of the fitting to accommodate the attachment thereto of a conduit 46 by which fluid medium of a fluid pressure system may be supplied to the opposite side of the diaphragm 13.

In operation, the space on the right side of the diaphragm 13 is filled with air under pressure of a predetermined value. Then fluid medium is supplied under pressure of a higher value through the fitting of the left side of the accumulator, thus further compressing the air on the right side of the diaphragm. The air pressure applied on the right side of the diaphragm may be predetermined to establish the effective pressure of the fluid medium which is stored in the left side of the diaphragm as viewed in Fig. 2.

An accumulator embodying the invention can be conveniently inexpensively formed of sheet metal of uniform thickness without requiring expensive machining operations. By virtue of the construction of the formed edge portion of the diaphragm, arrangement of rings 19 and 20 and the construction of the clamping band 21, the sheet metal sections of the accumulator may be securely held together and the formed edge portion of the diaphragm may be hermetically clampingly sealed between the mating edge portions of the sheet metal sections with sufficient force to withstand pressures of the order to which devices of this kind are conventionally subjected.

Although but one specific embodiment of the invention is herein shown and described, it will be understood that various changes in the size, shape and arrangement of parts may be made without departing from the spirit of the invention.

We claim:

1. A fluid pressure accumulator comprising complementary sheet steel sections having main wall portions and outwardly extending mating edge portions, a diaphragm comprising resilient material for partitioning the interior of said accumulator and having outer edge portions extending between parts of said mating edge portions, a metal wire disposed outwardly of said outer edge portions of the diaphragm between the remaining parts of said mating edge portions, and a clamping band surrounding said mating edge portions having opposed jaw portions bearing against the exterior of the latter at a location between said metal wire and said main wall portions for compressing the outer edge portions for said diaphragm between parts of said mating edge portions and urging the remaining parts thereof against said metal wire.

2. A fluid pressure accumulator comprising complementary sheet steel sections having main wall portions and outwardly extending mating edge portions, a diaphragm comprising resilient material for partitioning the interior of said accumulator and having outer edge portions extending between parts of said mating edge portions, a metal wire disposed outwardly of said outer edge portions of the diaphragm and between the remaining parts of said mating edge portions, a metal wire embedded in said diaphragm inwardly of the internal surface of said sections and having portions registering with said first mentioned metal wire, and a clamping band surrounding said mating edge portions having opposed jaw portions bearing against the exterior of the latter at a location between said metal wires for compressing the outer edge portions of said diaphragm between parts of said mating edge portions and urging the remaining parts thereof against said metal wire.

3. A fluid pressure accumulator including complementary substantially identical, semi-spherical sheet steel sections having spaced outwardly extending mating edge portions provided with approaching extremities and forming therebetween an annular recess having a restricted extremity, a diaphragm comprising resilient material for partitioning the interior of said accumulator and having a thickened formed outer edge portion comprising oppositely extending lateral flanges for seating upon the internal surface of said sections adjacent said mating edge portions and having an intermediate radially outwardly extending flange protruding between said mating edge portions forming a seal therebetween, a wire ring disposed in the restricted extremity of said recess adjacent the outer edge of said radial flange, and a clamping band surrounding said mating edge portions having opposed jaw portions bearing against the exterior of the latter at a location inwardly of said wire ring for deflecting said mating edge portions inwardly about said wire ring as a fulcrum in order to compress said radial flange between said mating edge portions and urging the approaching extremities of the latter against said wire ring.

4. A fluid pressure accumulator including complementary substantially identical, semi-spherical sheet steel sections having spaced outwardly extending mating edge portions provided with approaching extremities and forming therebetween an annular recess having a restricted extremity, a diaphragm comprising resilient material for partitioning the interior of said accumulator and having a thickened formed outer edge portion comprising oppositely extending lateral flanges for seating upon the internal surface of said sections adjacent said mating edge portions and having an intermediate radially outwardly extending flange protruding between said mating edge portions forming a seal therebetween, a wire ring disposed in the restricted extremity of said recess beyond the outer edge of said radial flange, a clamping band surrounding said mating edge portions having opposed jaw portions bearing against the exterior of the latter at a location inwardly of said wire ring for compressing said radial flange between said mating edge portions and urging the approaching extremities of the latter against said wire ring, and an inner wire ring embedded in the thickened outer edge portion of said diaphragm located within and concentric with said first mentioned ring and having portions in the same plane as the latter for cooperating with said first mentioned wire ring in confining said radial flange against expansion in a direction normal to its thickness, said inner wire ring being spaced from the junction of the wall of said accumulator and the mating edge portions thereof by only a small thickness of said resilient material in order to hold said inner ring against substantial displacement.

5. A fluid pressure accumulator including complementary substantially identical, semi-spherical sheet steel sections having spaced outwardly extending mating elge portions provided with approaching extremities and forming therebetween an annular recess having a restricted outer extremity tapering from the interior of said accumulator, a diaphragm comprising resilient material for partitioning the interior of said accumulator and having a thickened formed outer edge portion comprising oppositely extending lateral flanges for seating upon the internal surface of said sections adjacent said mating edge portions and having an intermediate radially outwardly extending flange conforming in shape with said tapered annular recess and protruding between said mating edge portions forming a seal therebetween, said lateral flanges having ridges on the surfaces thereof which engage said internal surfaces for increasing the sealing action between said diaphragm and said surfaces, a wire ring disposed in the restricted extremity of said recess adjacent the outer edge of said radial flange, and a clamping band surrounding said mating edge portions having opposed jaw portions bearing against the exterior of the latter at a location inwardly of said wire ring for compressing said radial flange between said mating edge portions and urging the approaching extremities of the latter against said wire ring.

6. A fluid pressure accumulator including complementary substantially identical, semi-spherical sheet metal sections having spaced outwardly extending mating edge portions comprising arcuately bent portions of said sheet metal having substantially regular and continuous surfaces, a rubber diaphragm having a thickened formed periphery adjacent said bent edge portions, said formed periphery having opposite laterally extending flanges provided with surface portions conforming generally with the curvature of said arcuately bent portions and seated thereon and provided with deformable seating ridges engageable with said continuous surfaces of said bent edge portions for normally producing a localized sealing pressure between said formed periphery and said surfaces, said formed periphery of said diaphragm having a web portion extending outwardly radially between said mating edge portions, and a clamping ring having opposed jaw portions engaging the external surfaces of said arcuately bent portions for urging the same toward each other and clampingly compressing said web therebetween.

7. A fluid pressure accumulator including complementary substantially identical, semi-spherical sheet metal sections having spaced outwardly extending mating edge portions comprising arcuately bent portions of said sheet metal, a rubber diaphragm having a thickened formed periphery adjacent said bent edge portions, said formed periphery having opposite laterally extending flanges provided with surface portions conforming generally with the curvature of said arcuately bent portions and seated thereon, said formed periphery of said diaphragm having a web portion extending between said mating edge portions, and a clamping ring having opposed jaw portions engaging the external surfaces of said arcuately bent portions for urging the same toward each other and clampingly compressing said web therebetween.

8. A fluid pressure accumulator including complementary substantially identical, semi-spherical sheet metal sections having spaced outwardly extending mating edge portions comprising arcuately bent portions of said sheet metal, a rubber diaphragm having oppositely extending flanges provided with a thickened formed periphery adjacent said bent edge portions, said formed periphery having surface portions conforming generally with the curvature of said arcuately bent portions and seated thereon, said formed periphery of said diaphragm having a web intermediate said flanges extending outwardly therefrom and disposed between said mating edges, a wire ring between said mating edges located outwardly with respect to said web and positively limiting approaching movement of the outermost parts of said mating edges, and a clamping band surrounding said mating edges having relatively movable jaw portions engaging the arcuately bent portions of the latter at a location inwardly of said wire ring and comprising means for urging said jaw portions toward each other in order to urge said arcuately bent and adjacent parts of said mating edges toward each other into clamping relationship with respect to said web while the outer extremities of said mating edges are held against inward deflection by said wire ring.

9. In a fluid pressure accumulator having complementary sheet metal sections including spaced outwardly extending mating edges and an elastic diaphragm for partitioning the interior of said accumulator, one of said sheet metal sections having an aperture therein and a surrounding outwardly extending flange comprising sheet metal portions of said section; a fitting detachably securable to said section having an externally threaded tubular portion extending through said aperture and a head portion provided with a recess for receiving said flange, said recess having a constricted inner extremity for wedgingly urging said flange against said tubular portion, a nut member threaded on the internal end of said tubular member for bearing against the internal side of said tubular member and urging said flange into said recess and means connected to said fitting for communicative connection with the interior of said accumulator.

10. In a fluid pressure accumulator having complementary sheet metal sections including spaced outwardly extending mating edges and an elastic diaphragm for partitioning the interior of said accumulator, one of said sheet metal sections having an aperture therein and a surrounding outwardly extending flange comprising sheet metal portions of said section; a fitting detachably securable to said section having an externally threaded tubular portion extending through said aperture and a head portion provided with a recess for receiving said flange, said recess having a constricted inner extremity for wedgingly urging said flange against said tubular portion, a nut member threaded on the internal end of said tubular member for bearing against the internal side of said tubular member and urging said flange into said recess, a shield mounted on said nut for protecting said diaphragm from injury and means connected to said fitting for communicative connection with the interior of said accumulator.

11. In a fluid pressure accumulator having complementary sheet metal sections including spaced outwardly extending mating edges and an elastic diaphragm for partitioning the interior of said accumulator, one of said sheet metal sections having an aperture therein and a surrounding outwardly extending flange comprising sheet metal portions of said section; a fitting detachably securable to said section having an externally threaded tubular portion extending through said aperture and a head portion provided with a recess for receiving said flange, a yieldable sealing element on the internal side of said section surrounding said tubular portion and engaging the junction of said section and said flange, a nut member threaded on the internal side of said tubular member for compressing said yieldable sealing element, said nut member having an abutment engageable with the internal side of said sheet metal section for urging said flange into said recess and means connected to said fitting for communicative connection with the interior of said accumulator.

12. A fluid pressure accumulator comprising complementary sheet metal sections having main wall portions and outwardly extending mating edge portions, a diaphragm comprising resilient material for partitioning the interior of said accumulator and including relatively thick marginal portions, said marginal portions having an outer part extending between parts of said mating edge portions for providing a seal therebetween and an inner part disposed within the space confined by said main wall portions, a metal wire embedded in said inner part of said marginal portion adjacent said mating edge portions for opposing inward expansion of the outer part of said marginal portion of said diaphragm, and a clamping band surrounding said mating edge portions having opposed jaws bearing against the exterior thereof at a location registering with said outer part of said marginal portion for compressing the latter between parts of said mating edge portions.

GEORGE J. HUEBNER, Jr.
GORDON R. PENNINGTON.